(12) United States Patent
Uehara

(10) Patent No.: US 12,392,392 B2
(45) Date of Patent: Aug. 19, 2025

(54) DAMPER DEVICE

(71) Applicant: EXEDY Corporation, Neyagawa (JP)

(72) Inventor: Hiroshi Uehara, Neyagawa (JP)

(73) Assignee: EXEDY Corporation, Neyagawa (JP)

( * ) Notice: Subject to any disclaimer, the term of this patent is extended or adjusted under 35 U.S.C. 154(b) by 354 days.

(21) Appl. No.: 18/172,469

(22) Filed: Feb. 22, 2023

(65) Prior Publication Data

US 2023/0313842 A1    Oct. 5, 2023

(30) Foreign Application Priority Data

Mar. 22, 2022    (JP) .................................. 2022-045574

(51) Int. Cl.
*F16F 15/129* (2006.01)

(52) U.S. Cl.
CPC ............................... *F16F 15/1297* (2013.01)

(58) Field of Classification Search
CPC .. F16F 15/129; F16F 15/1292; F16F 15/1295; F16F 15/1297; F16F 15/139; F16F 15/1392; F16F 15/1395; F16F 15/1397
USPC ............................................. 464/68.4, 68.41
See application file for complete search history.

(56) References Cited

U.S. PATENT DOCUMENTS

| | | | | |
|---|---|---|---|---|
| 7,238,111 B2 * | 7/2007 | Kintou | ................ | F16F 15/1297 464/46 |
| 7,819,751 B2 * | 10/2010 | Ebata | .................. | F16F 15/1395 464/68.41 |
| 8,257,183 B2 * | 9/2012 | Inoshita | .............. | F16F 15/1297 464/68.41 |
| 8,628,425 B2 * | 1/2014 | Sekine | ................ | F16F 15/1297 464/68.41 |
| 8,696,474 B2 * | 4/2014 | Saeki | .................. | F16F 15/1292 464/68.41 |
| 9,086,116 B2 * | 7/2015 | Saeki | .................. | F16F 15/1395 |
| 9,416,845 B2 * | 8/2016 | Usui | .................... | F16F 15/1397 |
| 10,948,024 B1 * | 3/2021 | Uehara | ............... | F16F 15/1297 |
| 2014/0221106 A1 * | 8/2014 | Jimbo | ................ | F16F 15/1397 464/45 |

FOREIGN PATENT DOCUMENTS

| | | | | |
|---|---|---|---|---|
| DE | 10248133 A1 * | 4/2004 | ......... | F16F 15/1395 |
| DE | 102018132749 A1 * | 6/2019 | ............. | F16F 15/32 |
| EP | 3006774 A1 * | 4/2016 | ............... | F16D 3/14 |
| JP | 2011-226572 A | 11/2011 | | |

* cited by examiner

*Primary Examiner* — Josh Skroupa
(74) *Attorney, Agent, or Firm* — United IP Counselors, LLC

(57) ABSTRACT

A damper device includes a first rotor, a second rotor, and an elastic member. The first rotor includes a contact surface. The contact surface faces a circumferential direction and extends in a radial direction. The second rotor is disposed to be rotatable relative to the first rotor. The second rotor includes a stopper surface extending in the radial direction. The stopper surface is opposed to the contact surface at an interval in the circumferential direction. The elastic member elastically couples the first rotor and the second rotor.

6 Claims, 5 Drawing Sheets

DAMPER DEVICE

CROSS-REFERENCE TO RELATED APPLICATIONS

This application claims priority to Japanese Patent Application No. 2022-045574 filed Mar. 22, 2022. The entire contents of that application are incorporated by reference herein in their entirety.

TECHNICAL FIELD

The present invention relates to a damper device.

BACKGROUND ART

A damper device is configured to absorb and attenuate fluctuations of a torque outputted from an engine by one or more coil springs. Specifically, the damper device includes a first rotor, a second rotor, and a plurality of coil springs elastically coupling the first and second rotors. Besides, another type of damper device has been also proposed that a hysteresis torque is generated by one or more friction materials.

The first and second rotors are rotated relative to each other. A stopper mechanism is provided for restricting the angle of relative rotation between the first and second rotors to a predetermined angular range. For example, Japan Laid-open Patent Application Publication No. 2011-226572 describes a damper device that a side plate includes radially extending stopper protrusions, while a hub plate includes axially extending stopper lock tabs. When the stopper protrusions and the stopper lock tabs contact with each other, further relative rotation is restricted between the side plate and the hub plate from the contact state. As a result, excessive compression of the respective coil springs is avoided.

In the damper device configured as described above, both the side plate and the hub plate are processed with carburizing so as not to be damaged by collision between the stopper protrusions and the stopper lock tabs. However, disuse of carburizing has been demanded from the perspectives of cost reduction and so forth. In view of this, it is an object of the present invention to provide a damper device that a stopper mechanism can be inhibited from being damaged without performing carburizing.

BRIEF SUMMARY

A damper device according to an aspect of the present invention includes a first rotor, a second rotor, and an elastic member. The first rotor includes a contact surface. The contact surface faces a circumferential direction and extends in a radial direction. The second rotor is disposed to be rotatable relative to the first rotor. The second rotor includes a stopper surface extending in the radial direction. The stopper surface is opposed to the contact surface at an interval in the circumferential direction. The elastic member elastically couples the first and second rotors.

According to this configuration, when the contact surface contacts with the stopper surface, the first and second rotors are restricted from rotating relative to each other at a greater angle than a predetermined angular range. Besides, both the contact surface and the stopper surface extend in the radial direction; hence, an area of contact between the contact surface and the stopper surface is greater in this configuration than in a well-known configuration that the contact surface and the stopper surface extend in different directions. As a result, a load per unit area, acting on the contact surface and the stopper surface, is made small, whereby a stopper mechanism can be inhibited from being damaged without performing carburizing.

Preferably, the first rotor includes a first plate and a second plate. The first plate is disposed on a first side of the second rotor in an axial direction. The second plate is disposed on a second side of the second rotor in the axial direction. The second rotor is disposed between the first and second plates in the axial direction.

Preferably, the first plate includes a first plate body, a connecting portion, and an attachment portion. The connecting portion extends from an outer peripheral part of the first plate body toward the second plate in the axial direction. The attachment portion extends radially outward from a distal end of the connecting portion. The attachment portion includes the contact surface.

Preferably, the second plate includes a protruding portion protruding toward the first plate in the axial direction. The attachment portion is attached to the protruding portion.

Preferably, the attachment portion protrudes toward the stopper surface in the circumferential direction relative to the connecting portion.

Preferably, the damper device further includes a friction plate, first and second side plates, a pressure plate, and an urging member. The friction plate is attached to the first plate body. The first side plate is disposed on the first side of the friction plate in the axial direction. The first side plate has an annular shape. The second side plate is disposed on the second side of the friction plate in the axial direction. The second side plate has an annular shape. The pressure plate is disposed between the second side plate and the friction plate in the axial direction. The urging member is disposed between the second side plate and the pressure plate. The urging member urges the pressure plate toward the friction plate.

Preferably, the second side plate is disposed radially outside the attachment portion. The second side plate is disposed to overlap with the attachment portion as seen in the radial direction.

Preferably, the urging member is disposed radially outside the connecting portion. The urging member is disposed to overlap with the connecting portion as seen in the radial direction.

Preferably, the second rotor includes a stopper portion protruding radially outward. The stopper portion includes the stopper surface.

Overall, according to the present invention, a stopper mechanism can be inhibited from being damaged without performing carburizing.

DETAILED DESCRIPTION

[Entire Configuration]

Figure 1:
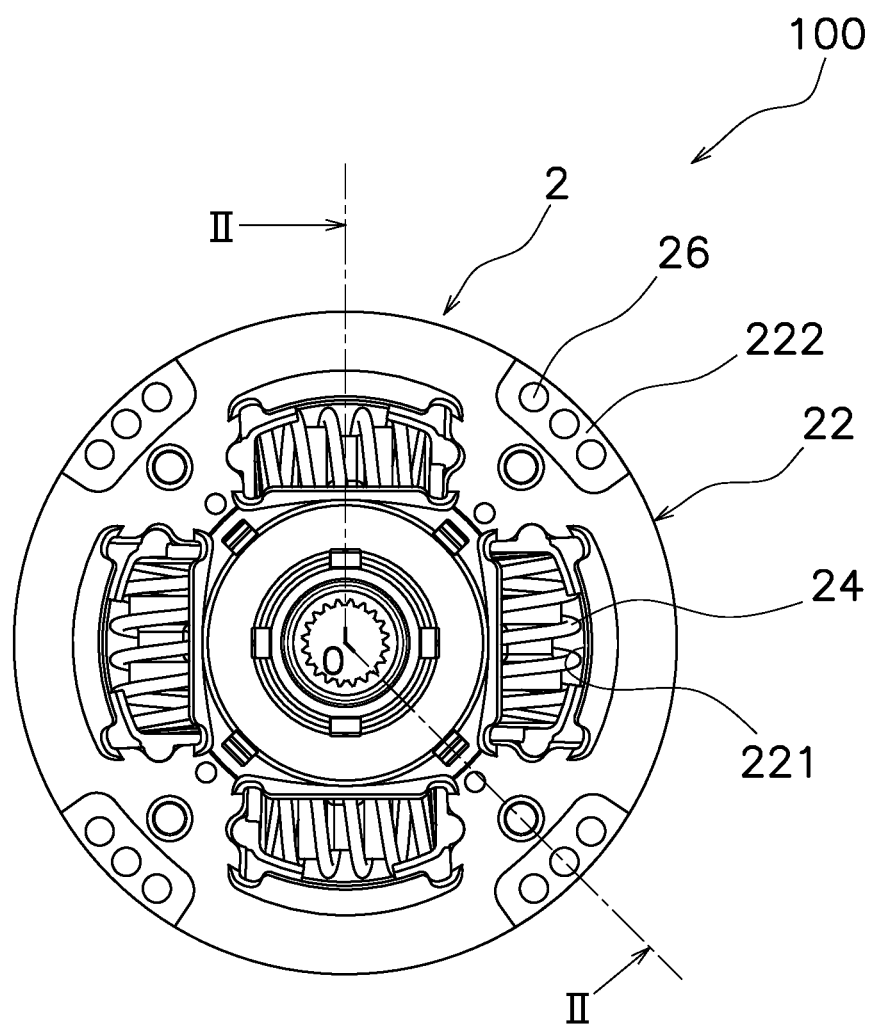
FIG. 1 is a front view of a damper device.
Figure 2:
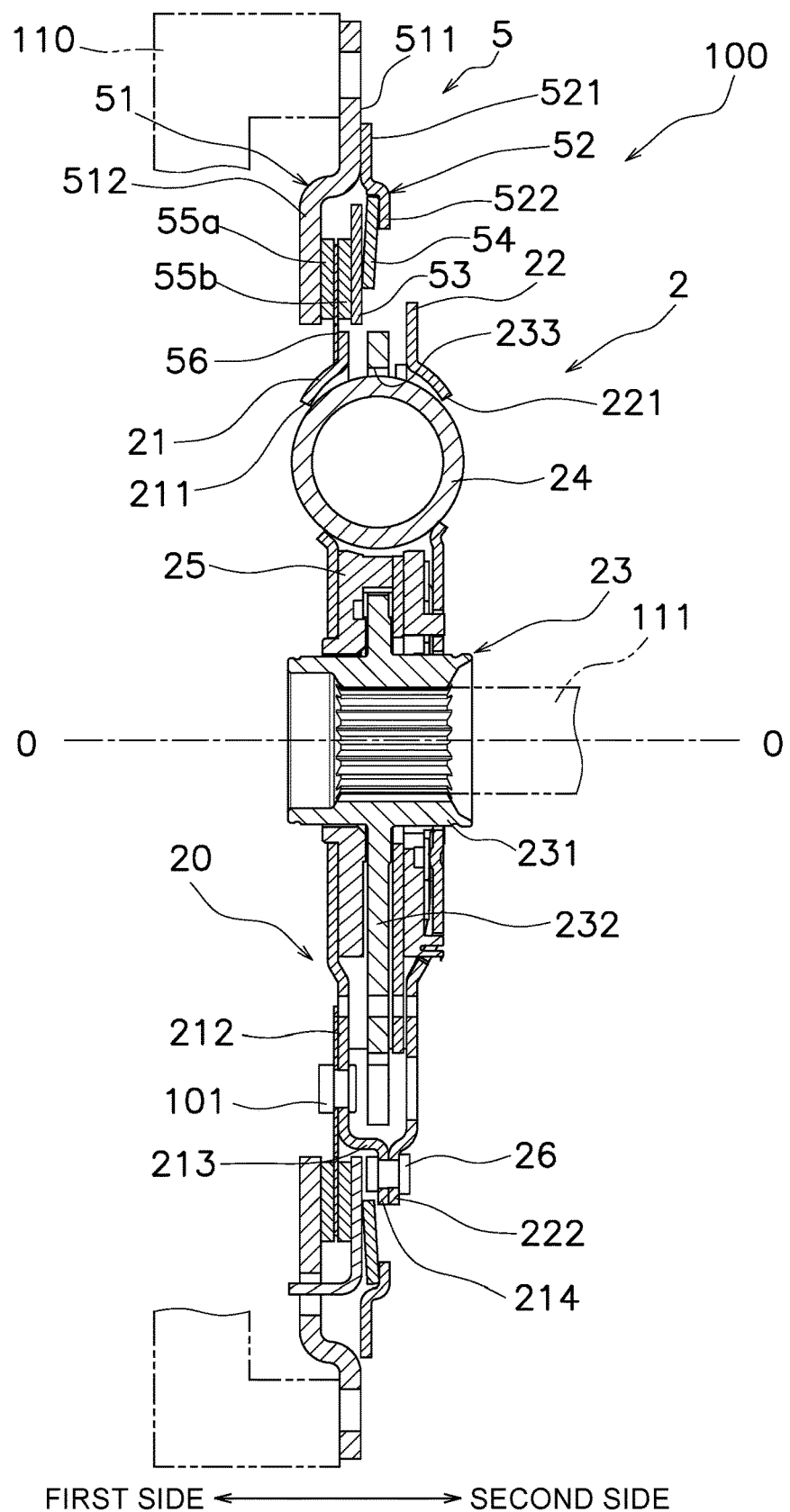
FIG. 2 is a cross-sectional view of FIG. 1 taken along line II-II.

FIG. 1 is a front view of a damper device 100 according to a present preferred embodiment, whereas FIG. 2 is a cross-sectional view of FIG. 1 taken along line II-II. It should be noted that in FIG. 1, a torque limiter unit is detached from the damper device 100. In FIG. 2, line O-O indicates a rotational axis of the damper device 100. In the following explanation, unless specifically stated otherwise, the term "rotation" means rotation about the rotational axis O. In FIG. 2, an engine (exemplary power source) is disposed on the left side of the damper device 100, whereas a drive unit, including an electric motor, a transmission, and so forth, is disposed on the right side of the damper device 100.

It should be noted that in the following explanation, the term "axial direction" refers to an extending direction of the rotational axis O of the damper device 100. Besides, the term "first side in the axial direction" means the left side in FIG. 2, whereas the term "second side in the axial direction" means the right side in FIG. 2. In other words, the term "first side in the axial direction" means an input side, whereas the term "second side in the axial direction" means an output side. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with the circumferential direction of the imaginary circle about the rotational axis O; likewise, the radial direction is not required to be perfectly matched with a diameter direction of the imaginary circle about the rotational axis O.

As shown in FIGS. 1 and 2, the damper device 100 is provided between a flywheel 110 and an input shaft 111 of the drive unit. The damper device 100 is disposed on the second side of the flywheel 110 in the axial direction. The damper device 100 is attached to the flywheel 110. In other words, the surface of the damper device 100, disposed on the first side in the axial direction, is covered with the flywheel 110. Besides, the damper device 100 is configured to limit a torque transmitted between the engine and the drive unit, and simultaneously, attenuate rotational fluctuations. The damper device 100 includes a damper unit 2 and a torque limiter unit 5.

[Torque Limiter Unit 5]

The torque limiter unit 5 is configured to be attached to the flywheel 110. The torque limiter unit 5 is disposed radially outside the damper unit 2. The torque limiter unit 5 is configured to limit the torque transmitted between the flywheel 110 and the damper unit 2.

The torque limiter unit 5 includes a first side plate 51, a second side plate 52, a pressure plate 53, a cone spring 54 (exemplary urging member), a first friction material 55a, a second friction material 55b, and a friction plate 56.

<First Side Plate>

The first side plate 51 has an annular shape. The first side plate 51 is attached to the flywheel 110. In other words, the first side plate 51 receives the torque transmitted thereto from the flywheel 110. The first side plate 51 is disposed on the first side of the friction plate 56 in the axial direction.

The first side plate 51 includes an outer peripheral portion 511 and an inner peripheral portion 512. The outer peripheral portion 511 is attached to the flywheel 110. The inner peripheral portion 512 is disposed on the first side of the outer peripheral portion 511 in the axial direction. The first side plate 51 receives an urging force applied by the cone spring 54 at the inner peripheral portion 512 thereof.

<Second Side Plate>

The second side plate 52 has an annular shape. The second side plate 52 is disposed on the second side of the friction plate 56 in the axial direction. The second side plate 52 is fixed to the first side plate 51 by rivets (not shown in the drawings) and/or so forth. Because of this, the second side plate 52 is unitarily rotated with the first side plate 51.

The second side plate 52 is disposed apart from the first side plate 51 at an interval in the axial direction. When described in detail, the second side plate 52 includes an outer peripheral portion 521 and an inner peripheral portion 522. Besides, the inner peripheral portion 522 of the second side plate 52 is disposed apart from the inner peripheral portion 512 of the first side plate 51 at the interval in the axial direction. It should be noted that the outer peripheral portion 521 of the second side plate 52 is in contact with the outer peripheral portion 511 of the first side plate 51.

The second side plate 52 has a lesser outer diameter than the first side plate 51. It should be noted that the outer diameter of the second side plate 52 can be equal to or greater than that of the first side plate 51. The second side plate 52 has a greater inner diameter than the first side plate 51. The second side plate 52 has a lesser plate thickness than the first side plate 51.

The first side plate 51 and the second side plate 52 are disposed radially outside attachment portions 214 (to be described). Further, the first side plate 51 is disposed to overlap with the attachment portions 214 as seen in the radial direction.

<Friction Plate>

The friction plate 56 has an annular shape. The friction plate 56 is configured to be unitarily rotated with first and second plates 21 and 22 (to be described). The friction plate 56 is attached to the first plate 21. When described in detail, the friction plate 56 is attached to a first plate body 212 (to be described) by rivets 101.

The friction plate 56 is disposed on the first side of the first plate 21 in the axial direction. The friction plate 56 has a lesser thickness than the first plate 21. The friction plate 56 is disposed axially between the first side plate 51 and the second side plate 52.

<Friction Materials>

Each of the first and second friction materials 55a and 55b has an annular shape. The first friction material 55a is disposed axially between the friction plate 56 and the first side plate 51. The second friction material 55b is disposed axially between the friction plate 56 and the second side plate 52. When described in detail, the second friction material 55b is disposed axially between the friction plate 56 and the pressure plate 53.

The first and second friction materials 55a and 55b are attached to the friction plate 56. The first friction material 55a is engaged by friction with the first side plate 51. On the other hand, the second friction material 55b is engaged by friction with the pressure plate 53. When a torque having a predetermined value or greater is inputted, the first friction material 55a is slid against the first side plate 51, while the second friction material 55b is slid against the pressure plate 53. As a result, the first side plate 51 and the friction plate 56 are rotated relative to each other. It should be noted that the first friction material 55a can be engaged by friction with the friction plate 56, while being fixed to the first side plate 51. On the other hand, the second friction material 55b can be engaged by friction with the friction plate 56, while being fixed to the pressure plate 53.

<Pressure Plate>

The pressure plate 53 has an annular shape. The pressure plate 53 is disposed axially between the second side plate 52 and the friction plate 56. When described in detail, the pressure plate 53 is disposed axially between the second friction material 55b and the cone spring 54.

<Cone Spring>

The cone spring 54 is disposed axially between the second side plate 52 and the pressure plate 53. The cone spring 54 urges the pressure plate 53 to the first side in the axial direction. In other words, the cone spring 54 urges the pressure plate 53 toward the friction plate 56. Accordingly, the friction plate 56 and both the first and second friction materials 55a and 55b are interposed between and held by the pressure plate 53 and the first side plate 51.

The cone spring 54 is disposed radially outside connecting portions 213 (to be described). Besides, the cone spring 54 is disposed to overlap with the connecting portions 213 as seen in the radial direction.

[Damper Unit 2]

The damper unit 2 includes an input rotor 20 (exemplary first rotor), a hub flange 23 (exemplary second rotor), and a plurality of elastic members 24. Besides, the damper unit 2 includes a hysteresis generating mechanism 25 and a plurality of fastening portions 26. The damper unit 2 is configured to attenuate rotational fluctuations.

<Input Rotor>

The input rotor 20 is a member into which a mechanical power, outputted from the engine, is inputted. When described in detail, the mechanical power, outputted from the engine, is transmitted to the input rotor 20 through the torque limiter unit 5. The input rotor 20 is disposed to be rotatable.

The input rotor 20 is composed of the first and second plates 21 and 22. Each of the first and second plates 21 and 22 is an annular member having a center hole.

<First Plate>

The first plate 21 is disposed on the first side of the hub flange 23 in the axial direction. The second plate 22 is disposed on the second side of the hub flange 23 in the axial direction. The first and second plates 21 and 22 are disposed apart from each other at an interval in the axial direction. Besides, the first and second plates 21 and 22 are disposed apart from the hub flange 23 at intervals in the axial direction. The first and second plates 21 and 22 are unitarily rotated with each other. Besides, the first and second plates 21 and 22 are immovable relative to each other in the axial direction.

Figure 3:
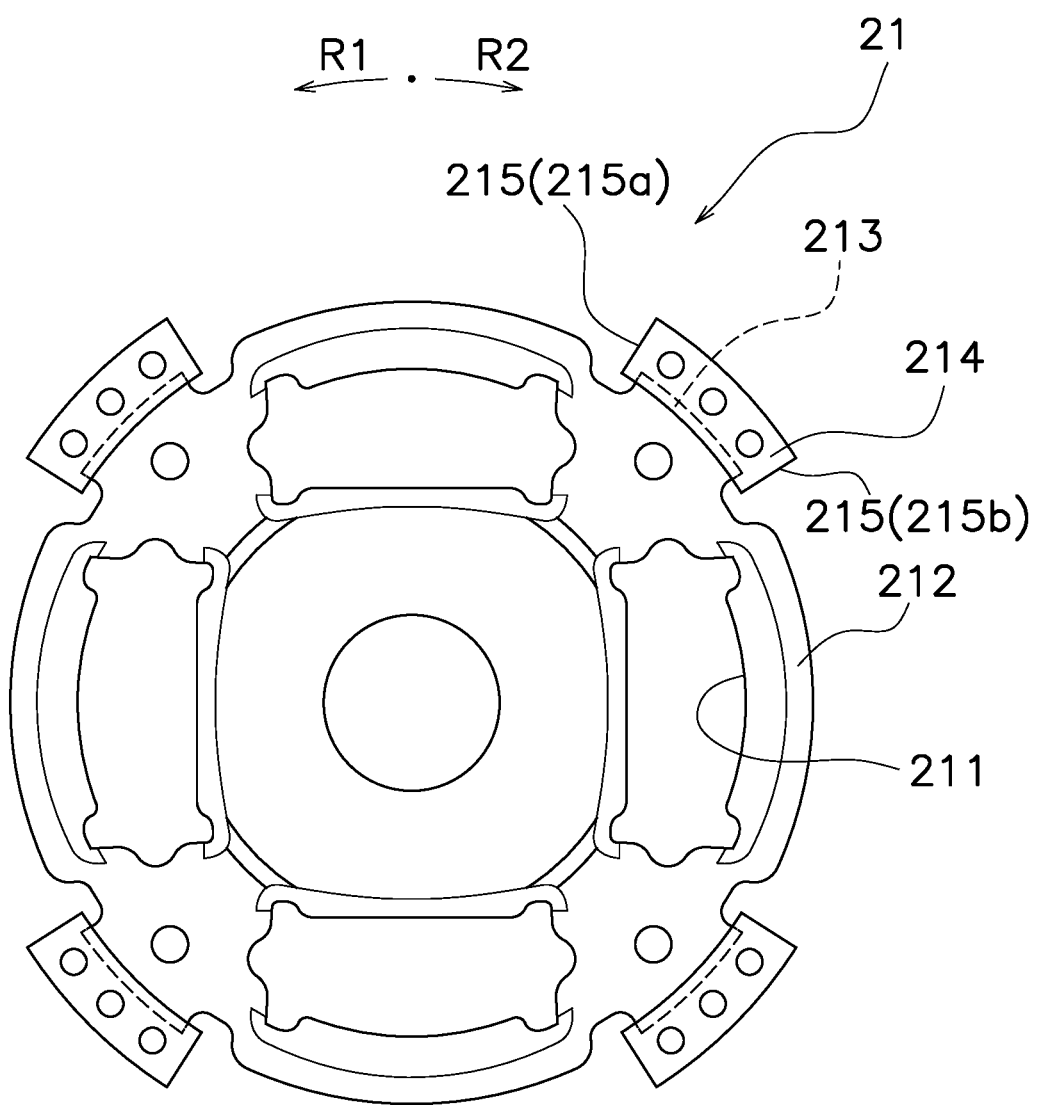
FIG. 3 is a front view of a first plate.

FIG. 3 is a front view of the first plate 21 seen from the second side in the axial direction. As shown in FIG. 3, the first plate 21 includes a plurality of first window portions 211. It should be noted that in the present preferred embodiment, the first plate 21 includes four first window portions 211. The first window portions 211 are aligned apart from each other at intervals in the circumferential direction.

As shown in FIGS. 2 and 3, the first plate 21 includes the first plate body 212, the plural connecting portions 213, and the plural attachment portions 214. It should be noted that in the present preferred embodiment, the first plate 21 includes four connecting portions 213 and four attachment portions 214.

The first plate body 212 has an annular shape. The connecting portions 213 protrude from the outer peripheral part of the first plate body 212 to the second side in the axial direction. In other words, the connecting portions 213 extend from the outer peripheral part of the first plate body 212 toward the second plate 22 in the axial direction. The connecting portions 213 are disposed apart from each other at intervals in the circumferential direction.

The attachment portions 214 extend radially outward from the distal ends of the connecting portions 213. It should be noted that the distal ends of the connecting portions 213 mean the axially second-side ends of the connecting portions 213. The attachment portions 214 are disposed apart from each other at intervals in the circumferential direction.

Each attachment portion 214 includes at least one contact surface 215. It should be noted that in the present preferred embodiment, each attachment portion 214 includes a pair of contact surfaces 215. In other words, each attachment portion 214 includes a first contact surface 215a and a second contact surface 215b.

The first and second contact surfaces 215a and 215b face in the circumferential direction. When described in detail, the first contact surface 215a faces a first rotational direction R1, whereas the second contact surface 215b faces a second rotational direction R2. The first rotational direction R1 herein means a direction in which the damper device 100 is rotated by the mechanical power outputted from the engine. The second rotational direction R2 means a reverse rotational direction to the first rotational direction R1. The first rotational direction R1 refers to the counter-clockwise direction in FIG. 3, whereas the second rotational direction R2 refers to the clockwise direction in FIG. 3.

Each contact surface 215 extends in the radial direction. Because of this, each contact surface 215 has a greater dimension in the radial direction than in the axial direction.

Each attachment portion 214 is greater in the circumferential dimension than each connecting portion 213. Because of this, each attachment portion 214 protrudes toward each stopper surface 235 (to be described) in the circumferential direction relative to each connecting portion 213. When described in detail, each attachment portion 214 protrudes relative to each connecting portion 213 in the first rotational direction R1. Further, each attachment portion 214 protrudes relative to each connecting portion 213 in the second rotational direction R2 as well; however, it should be noted that each attachment portion 214 may be designed not to protrude in the second rotational direction R2.

<Second Plate>

As shown in FIG. 1, the second plate 22 includes a plurality of second window portions 221. It should be noted that in the present preferred embodiment, the second plate 22 includes four second window portions 221. The second window portions 221 are aligned apart from each other at intervals in the circumferential direction. As seen in the axial direction, the second window portions 221 are disposed to overlap with the first window portions 211, respectively.

As shown in FIGS. 1 and 2, the second plate 22 includes a plurality of protruding portions 222. It should be noted that in the present preferred embodiment, the second plate 22 includes four protruding portions 222.

The second plate 22 has an annular shape. The protruding portions 222 are disposed in the outer peripheral end of the second plate 22. The protruding portions 222 protrude toward the first plate 21 in the axial direction as portions of the second plate 22. In other words, the protruding portions 222 protrude to the first side in the axial direction. It should be noted that portions of the second plate 22, overlapping with the attachment portions 214 as seen in the axial direction, protrude to the first side in the axial direction. In other words, the protruding portions 222 overlap with the attachment portions 214 as seen in the axial direction.

The protruding portions 222 are not opposed to the stopper surfaces 235 (to be described) in the circumferential direction but can be opposed to the stopper surfaces 235. The protruding portions 222 are disposed apart from each other at intervals in the circumferential direction.

The protruding portions 222 are disposed to overlap with the attachment portions 214 as seen in the axial direction. Besides, the attachment portions 214 are attached to the protruding portions 222, respectively, by the fastening portions 26. The fastening portions 26 are, for instance, rivets.

<Hub Flange>

Figure 4:
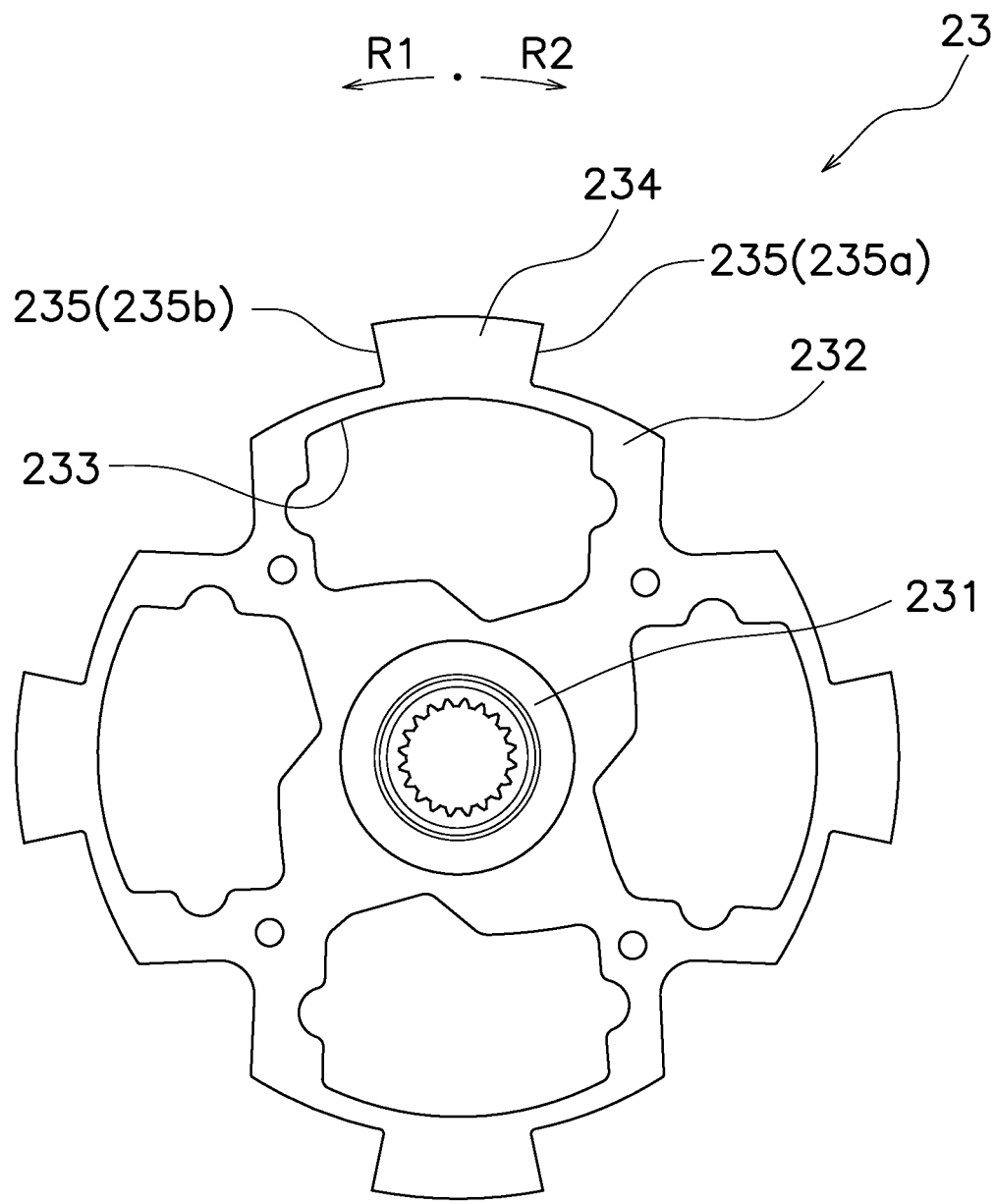
FIG. 4 is a front view of a hub flange.

As shown in FIGS. 2 and 4, the hub flange 23 is configured to transmit a torque, inputted thereto from the input rotor 20, to an output-side device. The hub flange 23 is disposed to be rotatable relative to the input rotor 20.

The hub flange 23 includes a hub portion 231, a flange portion 232, and a plurality of accommodation holes 233. The hub portion 231 and the flange portion 232 are integrated as a single member but can be separated as different members.

The hub portion 231 has a tubular shape and is disposed within the center holes of the first and second plates 21 and 22. The hub portion 231 is provided with a spline hole axially extending in the inner peripheral part thereof. The spline hole enables the input shaft 111, which is an output-side member, to be spline-coupled thereto.

The flange portion 232 radially extends from the outer peripheral surface of the hub portion 231. The flange portion 232 has an annular shape. The flange portion 232 is disposed axially between the first and second input plates 21 and 22.

The accommodation holes 233 are provided in the flange portion 232. It should be noted that in the present preferred embodiment, four accommodation holes 233 are provided in the flange portion 232. The accommodation holes 233 are aligned in the circumferential direction. Each accommodation hole 233 is disposed to overlap with each first window portion 211 and each second window portion 221 as seen in the axial direction.

The hub flange 23 includes a plurality of stopper portions 234. In the present preferred embodiment, the hub flange 23 includes four stopper portions 234. The stopper portions 234 protrude radially outward from the outer peripheral surface of the flange portion 232.

Each stopper portion 234 includes at least one stopper surface 235. It should be noted that in the present preferred embodiment, each stopper portion 234 includes a pair of stopper surfaces 235. In other words, each stopper portion 234 includes a first stopper surface 235a and a second stopper surface 235b.

The first and second stopper surfaces 235a and 235b are identical in extending direction to the first and second contact surfaces 215a and 215b. When described in detail, each of the first and second stopper surfaces 235a and 235b extends in a radial direction. Because of this, each of the first and second stopper surfaces 235a and 235b has a greater dimension in the radial direction than in the axial direction.

Figure 5:
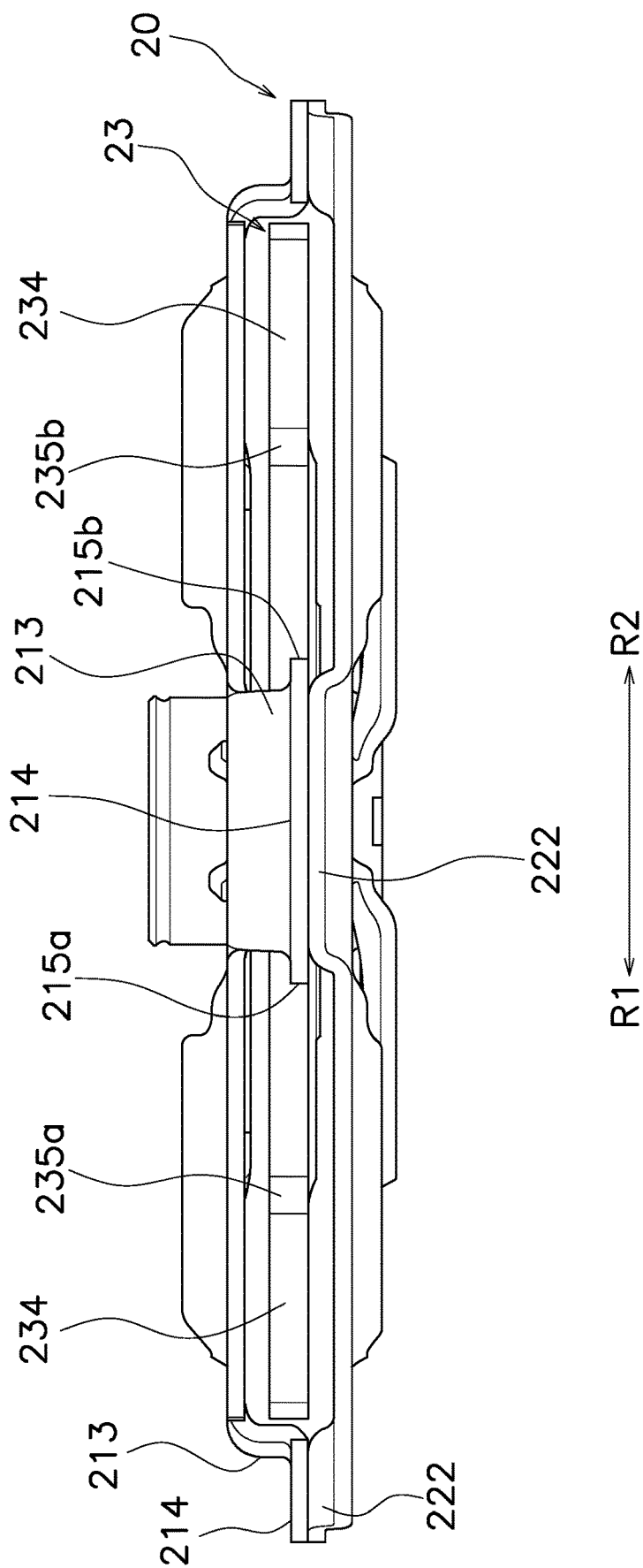
FIG. 5 is a side view for showing a stopper mechanism.

FIG. 5 is a side view of the damper device for showing stopper mechanisms. It should be noted that FIG. 5 omits illustration of members other than the input rotor 20 and the hub flange 23 for easy understanding of the drawing. As shown in FIGS. 4 and 5, each of the first and second stopper surfaces 235a and 235b faces the circumferential direction. When described in detail, each first stopper surface 235a faces the second rotational direction R2. Besides, each first stopper surface 235a is opposed to each first contact surface 215a at an interval in the circumferential direction. Because of this, when the input rotor 20 is rotated relative to the hub flange 23 in the first rotational direction R1, each first contact surface 215a contacts with each first stopper surface 235a. When each first contact surface 215a thus contacts with each first stopper surface 235a, the input rotor 20 is restricted from rotating relative to the hub flange 23 in the first rotational direction R1. It should be noted that each first stopper surface 235a does not contact with each protruding portion 222 but the structure can be modified so that contact can be made therewith. Each first stopper surface 235a and each first contact surface 215a compose a stopper mechanism functioning in the first rotational direction R1.

Each second stopper surface 235b faces the first rotational direction R1. Besides, each second stopper surface 235b is opposed to each second contact surface 215b at an interval in the circumferential direction. Because of this, when the input rotor 20 is rotated relative to the hub flange 23 in the second rotational direction R2, each second contact surface 215b contacts with each second stopper surface 235b. When each second contact surface 215b thus contacts with each second stopper surface 235b, the input rotor 20 is restricted from rotating relative to the hub flange 23 in the second rotational direction R2. It should be noted that each second stopper surface 235b does not contact with each protruding portion 222 but can contact therewith. Each second stopper surface 235b and each second contact surface 215b compose a stopper mechanism functioning in the second rotational direction R2.

<Elastic Members

As shown in FIGS. 1 and 2, the elastic members 24 are configured to elastically couple the input rotor 20 and the hub flange 23 in the rotational direction. The elastic members 24 are, for instance, coil springs.

The elastic members 24 are accommodated in the accommodation holes 233 of the flange portion 232, respectively. Besides, the elastic members 24 are accommodated in the first window portions 211 of the first plate 21, respectively, while being accommodated in the second window portions 221 of the second plate 22, respectively.

<Hysteresis Generating Mechanism>

The hysteresis generating mechanism 25 is configured to generate a hysteresis torque when relative rotation is caused between the input rotor 20 and the hub flange 23.

[Actions]

A torque, transmitted from the engine to the flywheel 110, is inputted to the damper unit 2 through the torque limiter unit 5. In the damper unit 2, the torque is inputted to the first rotor 20 and is then transmitted to the hub flange 23 through the elastic members 24. Subsequently, the mechanical power is transmitted from the hub flange 23 through the input shaft 111 to the electric motor, the transmission, a power generator, and so forth that are disposed on the output side.

Incidentally, chances are that an excessive torque is transmitted from the output side to the engine in, for instance, engine start. In such a case, the magnitude of torque to be transmitted to the engine side is limited to a predetermined value or less by the torque limiter unit 5.

[Modifications]

The present invention is not limited to the preferred embodiment described above and a variety of changes or modifications can be made without departing from the scope of the present invention. Besides, modifications to be described are applicable simultaneously.

(a) In the preferred embodiment described above, the input rotor 20 has been exemplified as the first rotor, while the hub flange 23 has been exemplified as the second rotor; however, the configuration of the damper device is not limited to this. For example, the hub flange 23 can be set as the first rotor, while the input rotor 20 can be set as the second rotor. In this case, the input rotor 20 is provided with stopper portions, while the hub flange 23 is provided with coupling portions and attachment portions.

(b) In the preferred embodiment described above, the input rotor 20 includes the first plate 21 and the second plate 22; however, the configuration of the input rotor 20 is not limited to this. For example, the input rotor 20 can include only the first plate 21 without including the second plate 22.

(c) In the preferred embodiment described above, the damper device 100 includes the first and second contact surfaces 215a and 215b and the first and second stopper surfaces 235a and 235b; however, the configuration of the damper device 100 is not limited to this. For example, the damper device 100 can include the first contact surfaces 215a and the first stopper surfaces 235a without including the second contact surfaces 215b and the second stopper surfaces 235b. Contrarily, the damper device 100 can include the second contact surfaces 215b and the second stopper surfaces 235b without including the first contact surfaces 215a and the first stopper surfaces 235a.

REFERENCE SIGNS LIST

20: Input rotor
21: First plate
212: First plate body
213: Connecting portion
214: Attachment portion
215: Contact surface
222: Protruding portion
234: Stopper portion
235: Stopper surface
22: Second plate
23: Hub flange
24: Elastic member
51: First side plate
52: Second side plate
53: Pressure plate
56: Friction plate
100: Damper device

What is claimed is:

1. A damper device comprising:
a first rotor including a contact surface, the contact surface facing a circumferential direction, the contact surface extending in a radial direction;
a second rotor disposed to be rotatable relative to the first rotor, the second rotor including a stopper surface extending in the radial direction, the stopper surface opposed to the contact surface at an interval in the circumferential direction; and
an elastic member configured to elastically couple the first and second rotors,
the first rotor including a first plate and a second plate, the first plate being disposed on a first side of the second rotor in an axial direction, the second plate being disposed on a second side of the second rotor in the axial direction, and
the second rotor being disposed between the first plate and second plate in the axial direction,
the first plate including a first plate body, a connecting portion, and an attachment portion, the connecting portion extending from an outer peripheral part of the first plate body toward the second plate in the axial direction, the attachment portion extending radially outward from a distal end of the connecting portion, and
the attachment portion including the contact surface and protruding toward the stopper surface in the circumferential direction relative to the connecting portion such that the attachment portion is wider than the connecting portion in the circumferential direction.

2. The damper device according to claim 1, wherein
the second plate includes a protruding portion protruding toward the first plate in the axial direction, and
the attachment portion is attached to the protruding portion.

3. The damper device according to claim 1, wherein
the second rotor includes a stopper portion protruding radially outward, and
the stopper portion includes the stopper surface.

4. A damper device comprising:
a first rotor including a contact surface, the contact surface facing a circumferential direction, the contact surface extending in a radial direction;
a second rotor disposed to be rotatable relative to the first rotor, the second rotor including a stopper surface extending in the radial direction, the stopper surface opposed to the contact surface at an interval in the circumferential direction; and
an elastic member configured to elastically couple the first and second rotors,
the first rotor including a first plate and a second plate, the first plate being disposed on a first side of the second rotor in an axial direction, the second plate being disposed on a second side of the second rotor in the axial direction, and
the second rotor being disposed between the first plate and second plate in the axial direction,
the first plate including a first plate body, a connecting portion, and an attachment portion, the connecting portion extending from an outer peripheral part of the first plate body toward the second plate in the axial direction, the attachment portion extending radially outward from a distal end of the connecting portion, and
the attachment portion including the contact surface
a friction plate attached to the first plate body;
a first side plate having an annular shape, the first side plate disposed on an input side of the friction plate in the axial direction;
a second side plate having an annular shape, the second side plate disposed on an output side of the friction plate in the axial direction;
a pressure plate disposed between the second side plate and the friction plate in the axial direction; and
an urging member disposed between the second side plate and the pressure plate, the urging member configured to urge the pressure plate toward the friction plate.

5. The damper device according to claim 4, wherein the second side plate is disposed radially outside the attachment portion, a portion of the second side plate and the attachment portion are on a same radius extending perpendicular to an axis of rotation of the damper device as seen in the radial direction.

6. The damper device according to claim 4, wherein the urging member is disposed radially outside the connecting portion, the urging member disposed to overlap with the connecting portion as seen in the radial direction.

* * * * *